Nov. 20, 1945.    E. W. BURKE    2,389,294
CARBOY TRUCK
Filed Nov. 13, 1943    2 Sheets-Sheet 1

INVENTOR.
Edward W. Burke
BY
Benj. T. Rauber
ATTORNEY.

Nov. 20, 1945. E. W. BURKE 2,389,294
CARBOY TRUCK
Filed Nov. 13, 1943 2 Sheets-Sheet 2
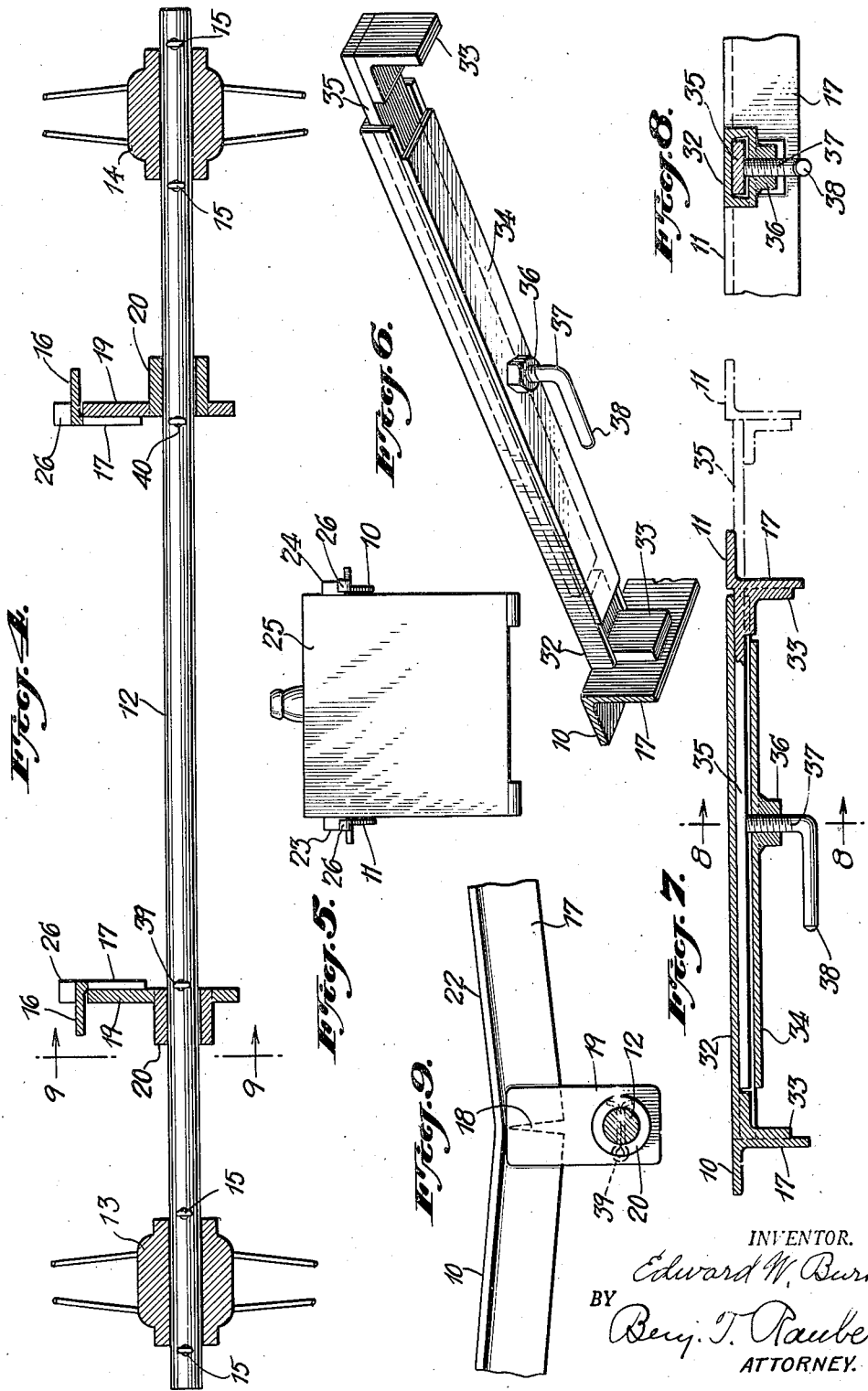
INVENTOR.
Edward W. Burke
BY
Benj. T. Rauber
ATTORNEY.

Patented Nov. 20, 1945

2,389,294

UNITED STATES PATENT OFFICE 2,389,294

CARBOY TRUCK

Edward W. Burke, Mahopac, N. Y., assignor to Pulmosan Safety Equipment Corporation, Brooklyn, N. Y., a corporation of New York Application November 13, 1943, Serial No. 510,232

1 Claim. (Cl. 280—34)

My invention relates to a carboy truck, that is to a two-wheeled truck having arms to engage the sides and lifting cleats of a carboy so that it may be wheeled from one place to another.

Carboys, such as those used for acids and other chemicals, are commonly enclosed in a box or case of wood having cleats on opposite sides whereby the carboy may be engaged and lifted. Carboy trucks are, therefore, provided generally with arms projecting forwardly from the axle of the wheels to pass on opposite sides of the carboy box beneath the cleats so that on tilting these arms upwardly the carboy is lifted from the ground and supported by the wheels. The dimensions of the carboy boxes or cases vary, however, some being wider than others, and it is, therefore, necessary to have the carrying or lifting arms of the carboy truck adjustable to or from each other so that they may closely engage the carboy and support the cleats without danger of slipping or dropping.

Inasmuch as the contents of the carboys are generally dangerous to handle, the truck must be of sturdy construction and be able to carry the carboys without danger of dropping them or permitting them to slip from a secure position on the truck.

My present invention provides a carboy truck having engaging bars which may be readily adjusted to fit carboys of different sizes and which may be secured in their adjusted position to prevent any displacement that would permit the carboy to slip or drop.

In my invention a pair of side rails are slidably mounted on the axle of the truck so that they may be adjusted for any desired spacing. These rails project forwardly to form a pair of lifting arms to engage the sides and support the cleats of a carboy and extend rearwardly to form a pair of handles whereby the truck may be moved about. The side rails are bent upwardly at a slight angle on opposite sides of the truck axle so that when the forward ends of the rails are tilted downwardly they may pass underneath the cleats of the carboy when the latter is on the floor and then by lowering the handle part of the rails may be lifted slightly to a horizontal position when the handles are in a convenient position for wheeling from one position to another.

The side rails may be slidable freely on the axle of the truck and are held in adjusted position by cross beams extending from one side rail toward the other in overlapping or telescoping position. One of these beams has a screw element which engages the other in any position of adjustment and holds the side rails securely. Preferably one of these beams is made of a channel iron the free edges of which are closed by a plate welded or otherwise secured thereto and having an opening through which a tightening screw may pass. The beams of the other rail pass into the channel or passage between the channel iron and the closing plate to be engaged by the end of the securing screw. Thus when the side rails and carrying arms are to be adjusted to any particular size of carboy the tightening screws of the cross beams are loosened, the side rails and carrying arms moved to the desired space and the screws again tightened to hold the arms in the adjusted position. It will be understood that two or more cross beams may be employed.

The projecting parts of the side rails may be bent toward each other or "toed in" just sufficiently to permit the carrying arms to pass freely and without friction along the sides of any carboy that may be passed between their outer ends but are not bent sufficiently to permit a cleat to drop between the carrying arms at any point. The outer ends of the carrying arms may also be turned up slightly to prevent a carboy from slipping off the front end.

The various features of my invention are illustrated by way of example in the accompanying drawings in which Fig. 1 is a plan view of a carboy truck embodying a preferred form of the invention, the position of the carboy being indicated by broken lines, as is also a second position or spacing of the side rails or carrying arms;

Fig. 4 is a cross-sectional view showing the mounting of the side rails on the axle;

Fig. 5 is a view in section of the carrying arms showing the manner in which they engage the sides and cleats of a carboy;

Fig. 6 is a perspective of a pair of cross beams;

Fig. 7 is a longitudinal view, and Fig. 8 a sectional view on line 8—8 of Fig. 7 of one of the cross beams;

Fig. 9 is a section taken on line 9—9 of Fig. 4.

Figure 1:
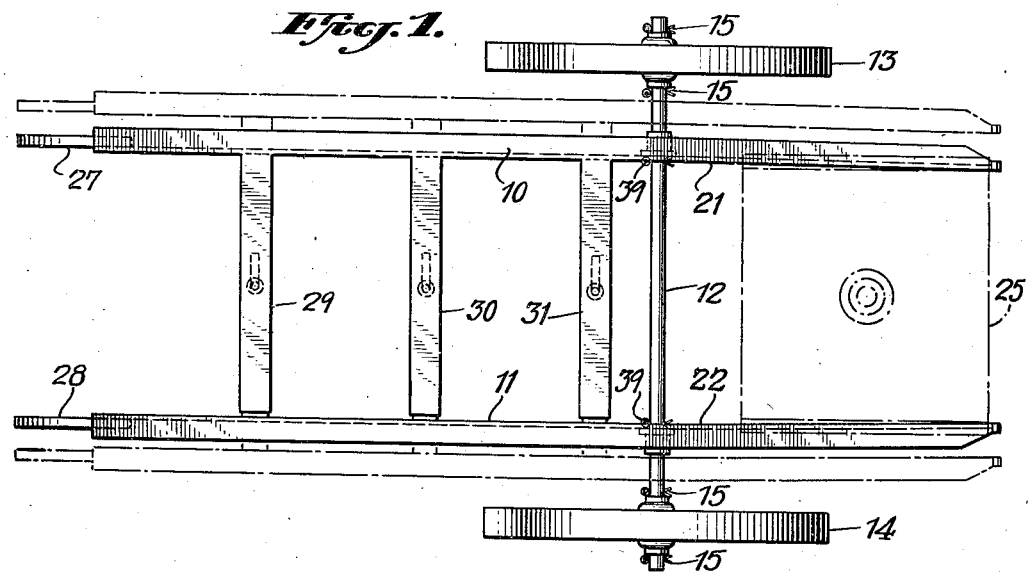
Figure 2:
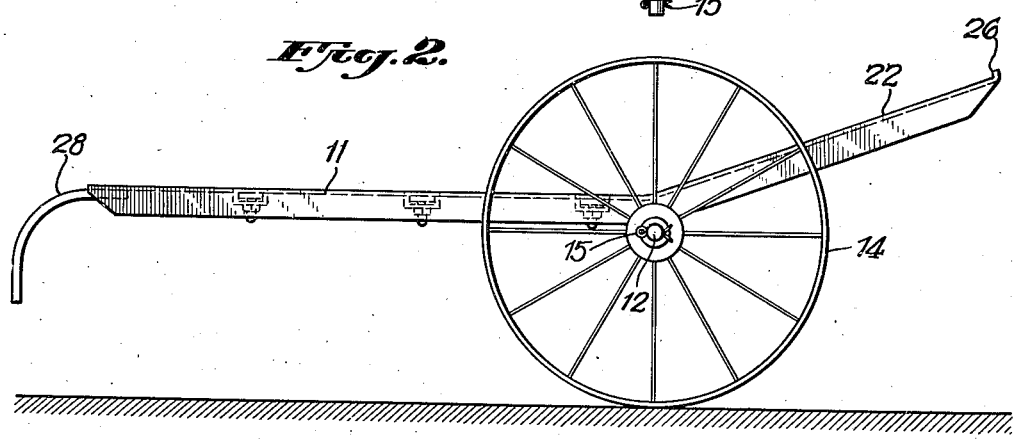
Fig. 2 is a side view of the carboy truck.

In the embodiment of the invention shown in the accompanying drawings a pair of side rails or side beams 10 and 11 are slidably mounted on an axle 12 carried by a pair of truck wheels 13 and 14. The wheels may be secured on the axle by any suitable means, such as the cotter pins shown at 15, to permit the wheels to turn freely on the axle. The side rails 10 and 11 may be formed of angle beams each having a horizontal flange 16 and a vertical flange 17 as indicated in Fig. 4. At the part of these beams immediately above the axle 12 the vertical flange 17 of each beam is cut at 18 and the beam bent at a slight angle. Welded or otherwise secured to the side flange 17 spanning the cut 18 is a downwardly extending extension or plate 19 to which is welded or otherwise secured a tubular bearing or hub 20 through which passes the axle 12. The axle 12 may turn freely in the hubs or bearings 20. The parts of the rails 10 and 11 extending forwardly of the axle 12 form a pair of lifting arms 21 and 22 to engage the undersides of the cleats as shown, for example, at 23 and 24 of a carboy case or box 25. These arms 21 and 22 are bent or "toed in" toward each other as indicated in Fig. 1 so that they will pass freely any carboy that will pass between their outer ends. The outer ends of the arms 21 and 22 are upturned slightly as at 26 to insure against the carboy slipping off the front ends of the arms while being carried from one position to another.

At the opposite ends of the side rails 10 and 11 are welded or otherwise secured a pair of handles 27 and 28, the lower ends of which may also serve as feet when this end of the truck is lowered.

The side rails 10 and 11 are securely held in any position of adjustment by means of cross beams 29, 30 and 31, three being shown by way of example. As shown more particularly in Figs. 6, 7 and 8, these cross beams are made of two overlapping or telescoping parts. One of the beams, for example that secured to the side rail 10, is made of channel iron 32 welded at a right angle to the depending flange 17 of the side rail. A reinforcing block 33 may be welded to the flange 17 and to the cross beam 32 to give it greater security and rigidity. A plate 34 is welded to the bottom edges of the flanges of the channel iron so as to form a hollow passage to receive a flat plate 35 welded to the vertical flange 17 of the opposite beam 11 in position to slide freely into the recess formed between the channel plate 32 and plate 34. To secure the beam 35 in any position of adjustment an opening is cut in the plate 34 and a nut 36 welded to the plate 34 in alignment with the opening therethrough through which a screw 37 may be threaded to engage the cross plate 35. This screw may be bent at a right angle to form a convenient handle 38.

Shifting of the framework formed by the side rails 10 and 11 and cross beams 29, 30 and 31 is limited by a pair of cotter pins 39 and 40, which also determine the minimum spacing of the side rails and carrying arms.

Figure 3:
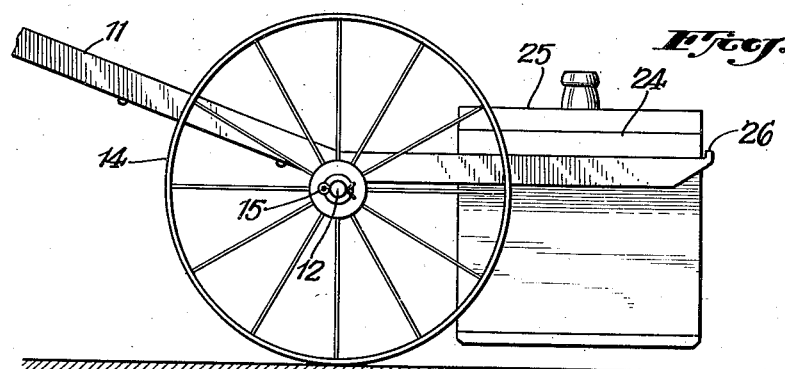
Fig. 3 is a view of the front part of the truck showing its position when transporting a carboy.

In using the truck it is wheeled to a position in front of a carboy, the carrying arms 21 and 22 lowered to a position below the cleats of the carboy by lifting the handles 27 and 28 and the truck then moved forward until the upturned ends 26 are beyond the ends of the cleats 23 and 24. By lowering the handles 27 and 28 the carrying arms 21 and 22 are lifted until the carboy is lifted off the floor, as shown in Fig. 3, whereupon the truck may be wheeled to any desired position and the beams 21 and 22 lowered to deposit the carboy. If the arms 10 and 11 are spaced too far apart to engage the cleats of a carboy securely the screws 37 are loosened to permit the cross beam plate 35 to slide in the recess between the plate 34 and the channel iron 32. The arms are then pushed together until they have the proper spacing for the particular carboy and the screw 37 is then tightened to hold the side rails and lifting arms securely in their newly adjusted position. Similarly if the arms are too closely spaced to engage a carboy the screws 37 are loosened, the side rails moved farther apart to their desired distance and the screws again tightened. When the screws 37 are tightened onto the plate 35 the spacing of the carrying arms is fixed and the truck may be wheeled from one position to another without danger of the arms spreading and dropping a carboy.

What I claim is:

A carboy truck which comprises an axle, a pair of wheels mounted on said axle, a pair of side rails of angle cross-section positioned in spaced position above and at right angles to said axle with a downwardly extending flanges, said flange being slit above said axle and said side rails being bent upwardly at said slit, a plate welded to the vertical flanges of said side rails in a position spanning said slit to form slidable supports for said side rails on said axle, cross beams extending between and connecting said side rails at one side of said axle, said cross beams each comprising a channel iron welded to the vertical flange of one side rail and extending at a right angle thereto, a plate welded to and extending at a right angle from the opposite side rail into the space between the flanges of said channel iron, a plate welded to the lower edges of the flanges of said channel iron to enclose said plate and a screw threaded through said closing plate.

EDWARD W. BURKE.